US006983918B1

(12) United States Patent
Leasure

(10) Patent No.: US 6,983,918 B1
(45) Date of Patent: *Jan. 10, 2006

(54) DRINK HOLDER

(76) Inventor: Richard L. Leasure, 11355 Backus Rd., Wattsburg, PA (US) 16442

( * ) Notice: Subject to any disclaimer, the term of this patent is extended or adjusted under 35 U.S.C. 154(b) by 70 days.

This patent is subject to a terminal disclaimer.

(21) Appl. No.: 10/760,909

(22) Filed: Jan. 20, 2004

Related U.S. Application Data

(63) Continuation-in-part of application No. 10/334,389, filed on Dec. 31, 2002, now Pat. No. 6,679,465, and a continuation-in-part of application No. 10/395,583, filed on Mar. 24, 2003, now Pat. No. 6,802,483.

(51) Int. Cl.
*A47K 1/08* (2006.01)

(52) U.S. Cl. .................................. 248/311.2; 248/274.1

(58) Field of Classification Search ................. 248/314, 248/311.2, 274.1, 229.15, 229.24, 228.1, 248/228.6, 292.12, 220.21, 309.1; 182/187
See application file for complete search history.

(56) References Cited

U.S. PATENT DOCUMENTS 3,532,318 A * 10/1970 Lloyd ....................... 248/311.2
4,887,784 A * 12/1989 Kayali ...................... 248/311.2
5,106,046 A * 4/1992 Rowles et al. ............ 248/311.2
5,398,160 A * 3/1995 Umeda ........................ 361/707
5,938,160 A * 8/1999 Hartmann et al. ......... 248/311.2
5,996,957 A * 12/1999 Kurtz ....................... 248/311.2
6,676,465 B2 * 1/2004 Karvinen ..................... 440/55

FOREIGN PATENT DOCUMENTS

FR 2612064 * 9/1988

* cited by examiner

*Primary Examiner*—Ramon O Ramirez
(74) *Attorney, Agent, or Firm*—Richard K. Thomson

(57) ABSTRACT

A drink holder which may be used in a tree stand or attached to a golf cart. A T-shaped clamping element has a pair of differing width flanges permitting the clamping of tubular members having different thicknesses. The clamping element is bolted to a first member having a ratchet face on one surface which engages a second ratchet face on a second element to permit angular adjustment between the first and second elements. The second member has a ring portion interconnected to a secondary cruciform-shaped support which may receive a drink, such as a beverage can or water bottle. A secondary support is attached to a bottom surface of the cruciform-shaped support and has a pair of horizontally extending arms which can suspend a handle of a Thermos® bottle or lunch pail.

9 Claims, 3 Drawing Sheets

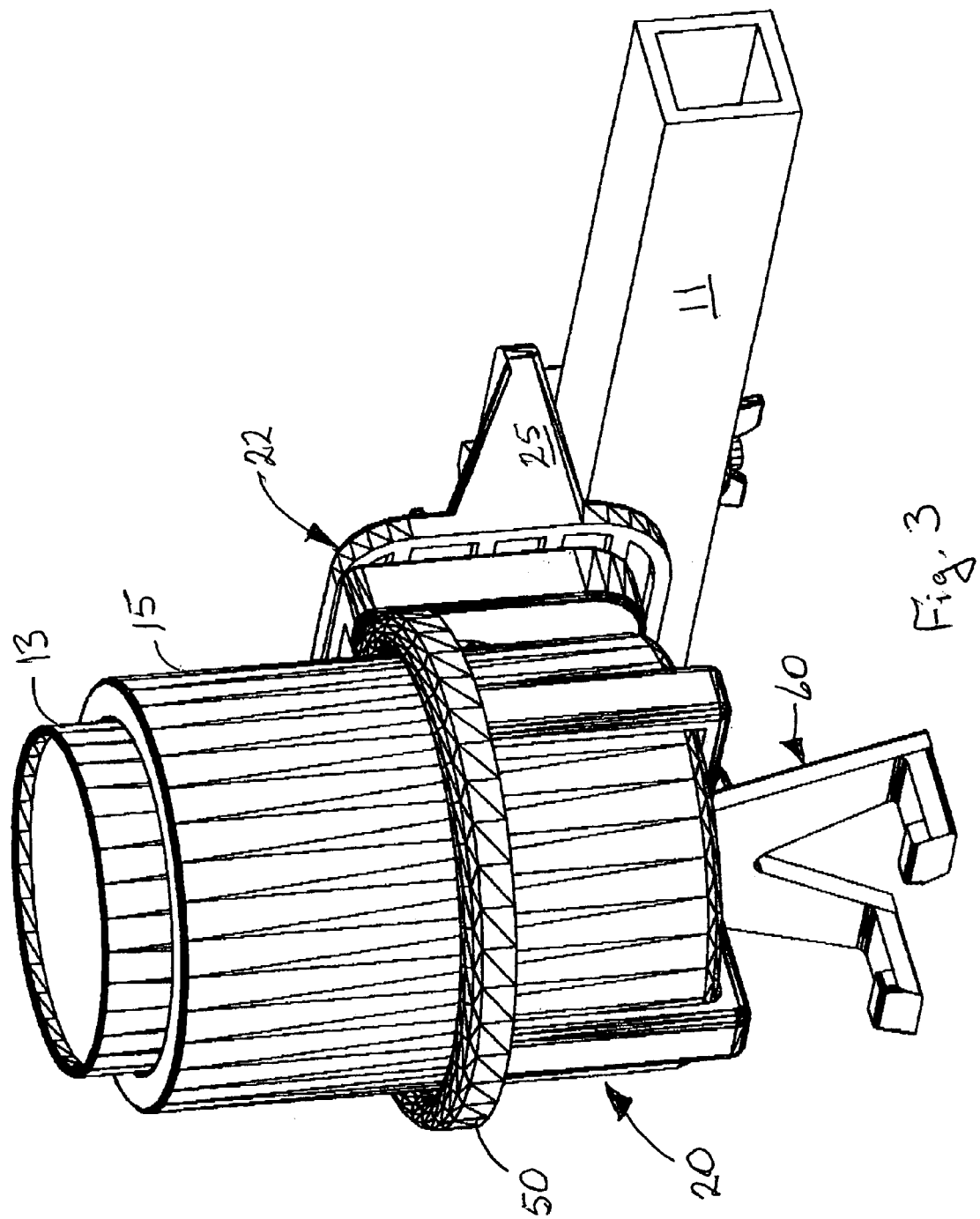

DRINK HOLDER

The present invention is a continuation-in-part of U.S. patent application Ser. No. 10/334,389, filed Dec. 31, 2002 now U.S. Pat. No. 6,679,465 entitled "Bow Rest" issued Jan. 20, 2004, and of U.S. patent application Ser. No. 10/395,583 filed Mar. 24, 2003 now U.S. Pat. No. 6,802,483 entitled "Gun Rest", both hereby incorporated by reference. The present invention is directed to a drink holder which can be used with a tree stand or golf cart. The clamping device utilized with the Bow Rest and Gun Rest has proven so successful, it has been utilized with a number of other devices including this drink holder.

BRIEF DESCRIPTION OF THE DRAWINGS

The preferred embodiment(s) of the present invention are set forth in the drawings, like items bearing like reference numerals and in which

FIG. 3 is an assembled perspective view of the first embodiment shown holding a drink.

DETAILED DESCRIPTION OF THE PREFERRED EMBODIMENT(S)

Figure 1:
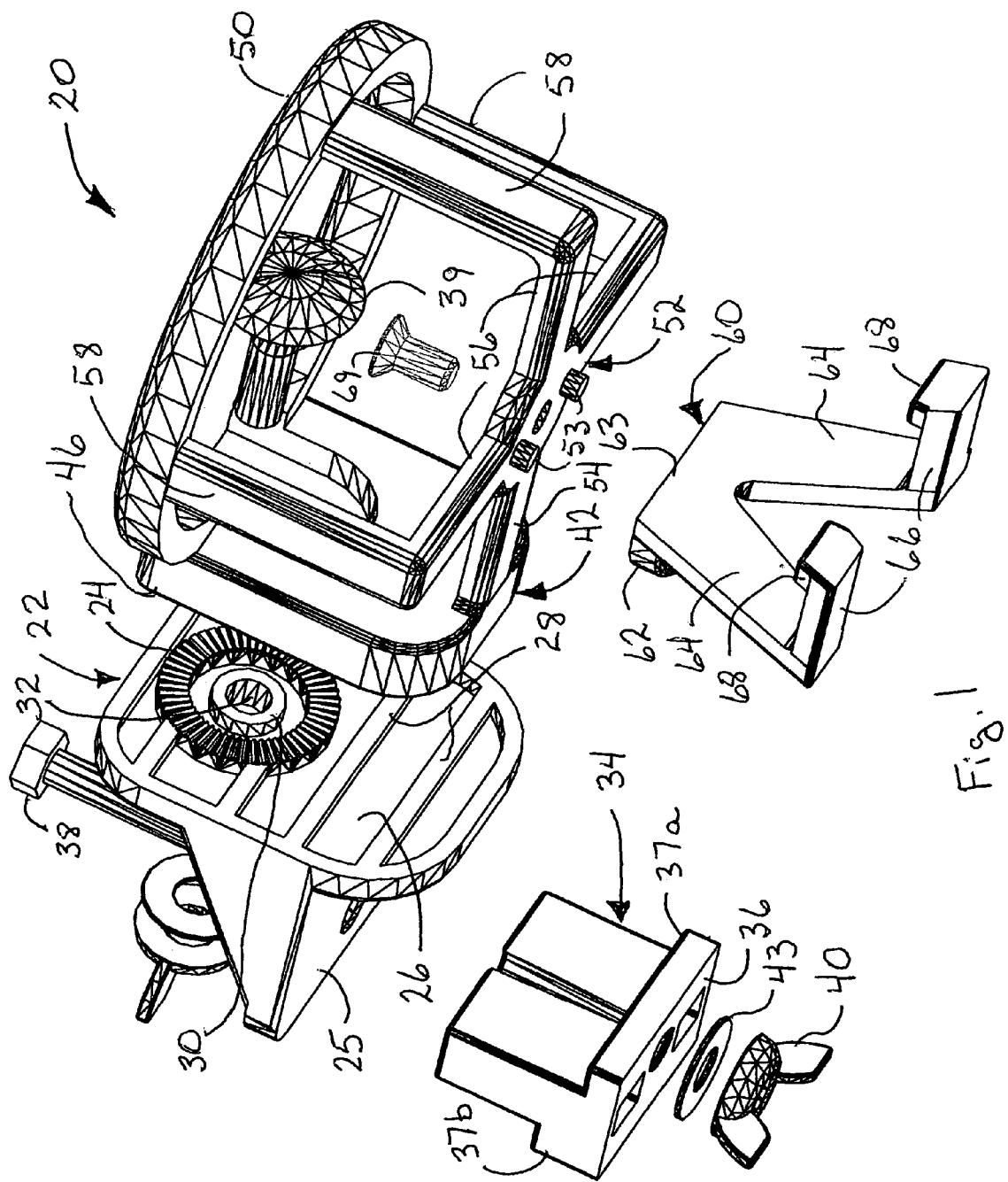
FIG. 1 is a right front exploded perspective view of a first embodiment of the drink holder of the present invention.
Figure 2:
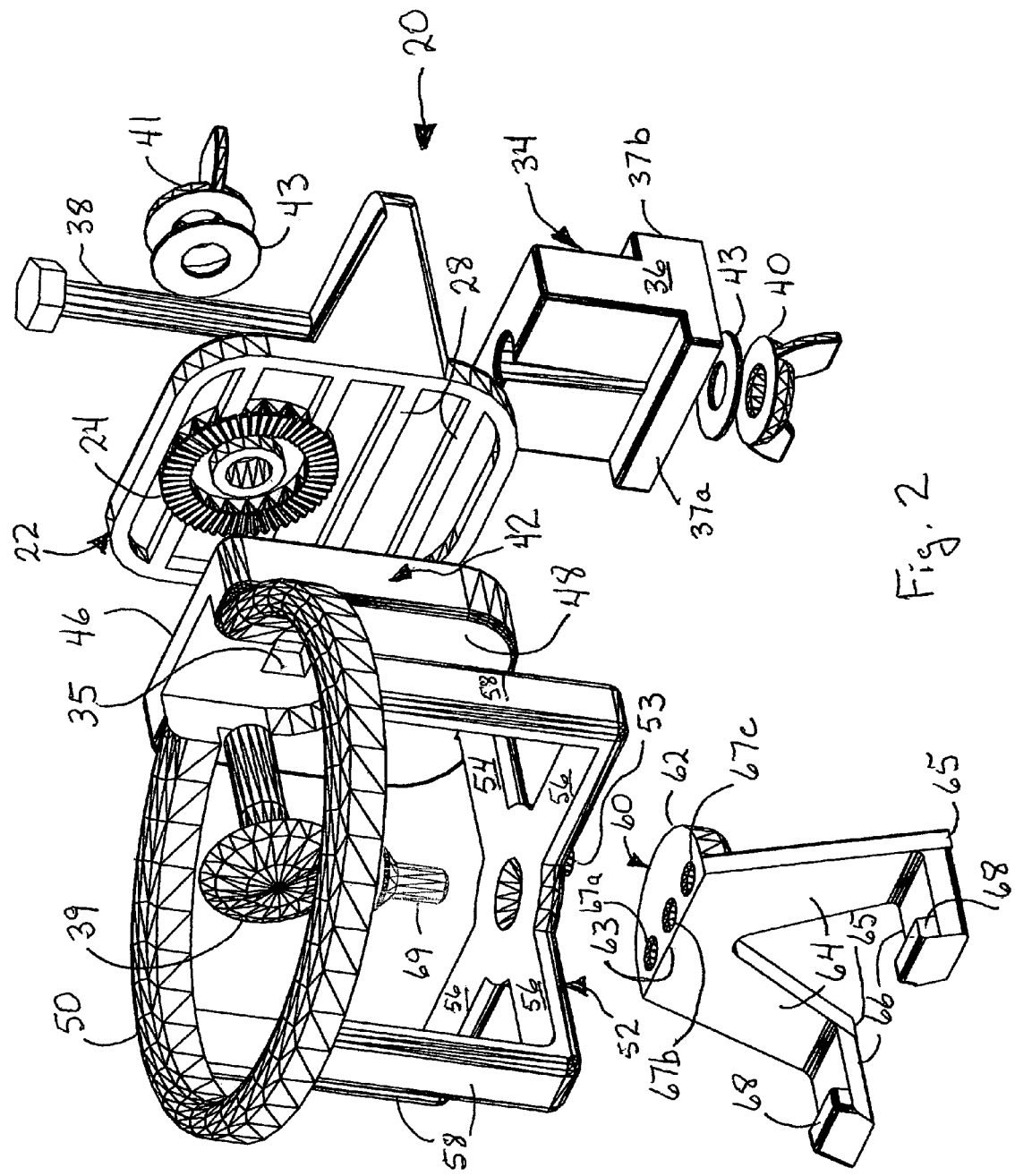
FIG. 2 is a left front exploded perspective view of the first embodiment.

A first preferred embodiment of the can holder of the present invention is shown in FIGS. 1–3 generally at 20. Drink holder 20 comprises a first member or base plate 22 with a first ratchet face 24 on first lateral face 26 (FIG. 3). Drink holder 20 incorporates means 34 to attach it to a frame member 11 of a tree stand, golf cart, or the like (FIG. 3). Means 34, in this embodiment includes T-shaped arm 36 which clamps frame member 11 between laterally extending section 37a of T-shaped arm and flange 25 of first member 22 using bolt 38 and wing nut 40 with washer 43 reducing the risk of undesired loosening and distributes the clamping force of wing nut 40 over a larger surface. The width of the two flanges 37a and 37b on the T-shaped arm 36 are different to accommodate varying sizes of frame members 11. Obviously, other clamping means could be used, although this particular means has proven simple and reliable. Reinforcement ribs 28 provide structural stability while minimizing material usage. The material used to form the first and second members of the drink holder is a high-strength, highly durable plastic. While there are other suitable materials, acrylonitrile-butadiene-styrene (ABS) has proven itself to be suitable for this application. Ratchet face 24 surrounds collar 30 which itself surrounds and defines aperture 32 that receives a second bolt 39.

Second member or drink cradle 42 has a second ratchet face (not shown) on first lateral face 46 which mates with first ratchet face 24, the ratchet face surrounding a square opening 35 that engages a neck on the bolt 39 in a conventional manner, to prevent its rotation during securing and removal of wing nut 41. Washer 43 distribute the clamping force applied by wing nut 41 and the head of the bolt 39 over the surface of the mating ratchet faces preventing slippage. The opposing lateral face 48 of second member 42 has a circular outer support arm or ring portion 50 and a first support element 52 which has a cruciform shape. A first arm 54 of cruciform-shaped support 52 is attached directly to second member 42. Each of the other three arms 56 of cruciform-shaped support 52 are interconnected to ring portion 50 by vertically extending connecting arms 58. Ring portion 50 and cruciform-shaped support 52 form a cradle in which a drink, such as a beverage can or water bottle, can rest.

Secondary support 60 is suspended beneath cruciform-shaped support 52. Secondary support 60 comprises a platform 62, a pair of downwardly extending arms 64 connected to a front face 63 of said platform, a generally horizontal arm 66 extending outwardly from a distal end 65 of each of said downwardly extending arms. End stop 68 formed at the outer end of each outwardly extending arm 66 provides a place to suspend a Thermos® bottle or lunch pail or the strap for any of a variety of containers. Platform 62 has an aligned series of three apertures, 67a, 67b, and 67c (FIG. 2). Central aperture 67b is internally threaded to allow bolt 69 to secure it to the bottom of cruciform-shaped support 52. The outer two apertures 67a and 67c each receive a rotation-limiting post 53 (FIG. 1) formed integrally on the bottom of cruciform-shaped support 52.

In operation, base plate 22 of drink holder 20 is clamped to frame member 11 of a tree stand golf cart, or the like, by loosening wing nut 40 placing laterally extending section 37a or 37b of T-shaped arm 36 on a side of member 11 opposite the side flange 25 occupies and tightening wing nut 40 on bolt 38. Typically, when mounted on a tree stand, section 37a will engage the bottom surface of member 11 while flange 25 sits on its top surface. When mounted to a vertically extending bar on a golf cart, flange 25 and section 37a or 37b will be mounted on opposing sides of member 11. Wing nut 41 can be loosened on bolt 39 permitting second member 42 be rotated and adjustably positioned at an optimal position relative to first member 22. When the wing nut 41 is tightened, the two engaged ratchet surfaces will hold the ring portion 50 and cruciform-shaped support 52 in the desired support position for the drink. Secondary support 60 is secured to bottom of cruciform-shaped support 52 using bolt 69 and may be used to suspend whatever is desired there from. As seen in FIG. 3, once drink holder 20 is properly mounted, a beverage can 13 with insulating sleeve 15 can be inserted in ring portion 50.

A number of changes, alternatives and modifications will become apparent after a reading of the foregoing specification. It is intended that all such changes, alternatives and modifications as fall within the scope of the appended claims be considered part of the present invention.

I claim:

1. A holder for securing a cylindrical article to a tubular structure, or the like, said holder comprising
   a) a first member with a first ratchet face on a first lateral face thereof;
   b) attachment means for securing said second member to a portion of the tubular structure;
   c) a second member with a second ratchet face on a first lateral face thereof, said second ratchet face being engageable with said first ratchet face to adjustably position said second member relative to said first member, said second member having a supporting element extending outwardly from a second lateral face opposite said first lateral face of said second member, said supporting element including a bottom surface for holding a cylindrical article and further including a secondary support attached to said bottom surface of said supporting element, said secondary support receiving a second article;
   d) clamping means for securing said second ratchet face in rotationally adjustable contact with said first ratchet face;

whereby said holder is attached to the tubular structure, said second member adjusted to a desired rotational position relative to said first member, and a cylindrical article inserted into said supporting element for retention in a desired posture.

2. The holder of claim 1 wherein said first member is comprised of a high strength, high durability plastic.

3. The holder of claim 2 wherein said second member is comprised of a high strength, high durability plastic.

4. The holder of claim 3 wherein said second member is comprised of the same high strength, high durability plastic as said first member.

5. The holder of claim 4 wherein said high strength, high durability plastic is ABS.

6. The holder of claim 1 wherein said supporting element comprises a ring portion interconnected to a base portion.

7. The holder of claim 6 wherein said base portion comprises a cruciform element having a first arm directly connected to said second lateral face of said second member and each of the other three arms are interconnected to said ring portion by generally vertically extending connecting arms.

8. The holder of claim 1 wherein said secondary support comprises a platform, a pair of downwardly extending arms connected to a fron face of said platform, a generally horizontal arm extending outwradly from a distal end of each of said downwardly extending arms.

9. The holder of claim 8 wherein said platform has three laterally positioned apertures, a central aperture being internally threaded, and each of said outer apertures receiving a rotation resisting post formed on said bottom surface of said cruciform element.

* * * * *